United States Patent [19]

Sogge

[11] 4,055,368
[45] Oct. 25, 1977

[54] BIASING ELEMENT HAVING ONE OR MORE FORCE STAGES

[75] Inventor: John W. Sogge, Cedar Rapids, Iowa
[73] Assignee: Caterpillar Tractor Co., Peoria, Ill.
[21] Appl. No.: 680,815
[22] Filed: Apr. 28, 1976
[51] Int. Cl.² .............................................. B62D 55/12
[52] U.S. Cl. ........................................ 305/57; 74/443; 267/63 R; 267/152
[58] Field of Search ................... 267/63 R, 152, 22 R; 305/57; 74/443

[56] References Cited

U.S. PATENT DOCUMENTS

| 2,448,962 | 9/1948 | D'Ardenne | 267/63 R X |
| 3,889,550 | 6/1975 | Boggs et al. | 74/443 |
| 3,897,980 | 8/1975 | Dester et al. | 305/57 |

Primary Examiner—Robert B. Reeves
Assistant Examiner—John P. Shannon
Attorney, Agent, or Firm—Frank L. Hart

[57] ABSTRACT

A biasing element has a force transmitting material positioned within a chamber of a housing having deflectable walls. A piston contacts and moves the force transmitting material into forcible contact with the housing walls in response to movement of the piston. Further movement of the piston deflects the housing walls in response to forces from the force transmitting material in the housing.

6 Claims, 7 Drawing Figures

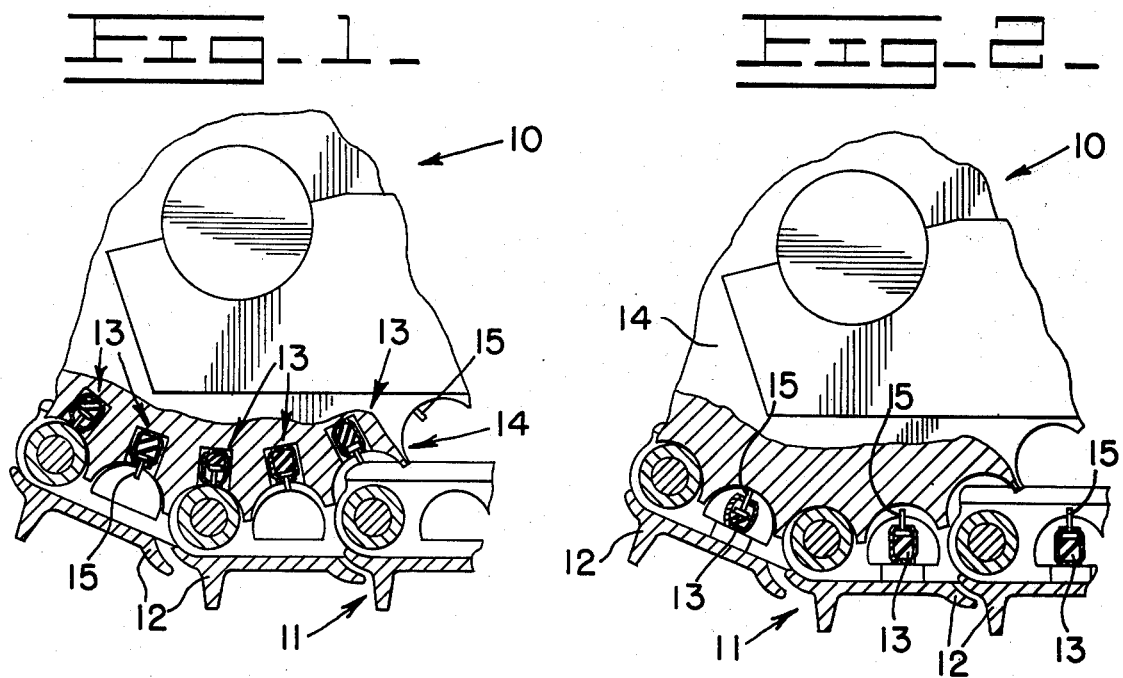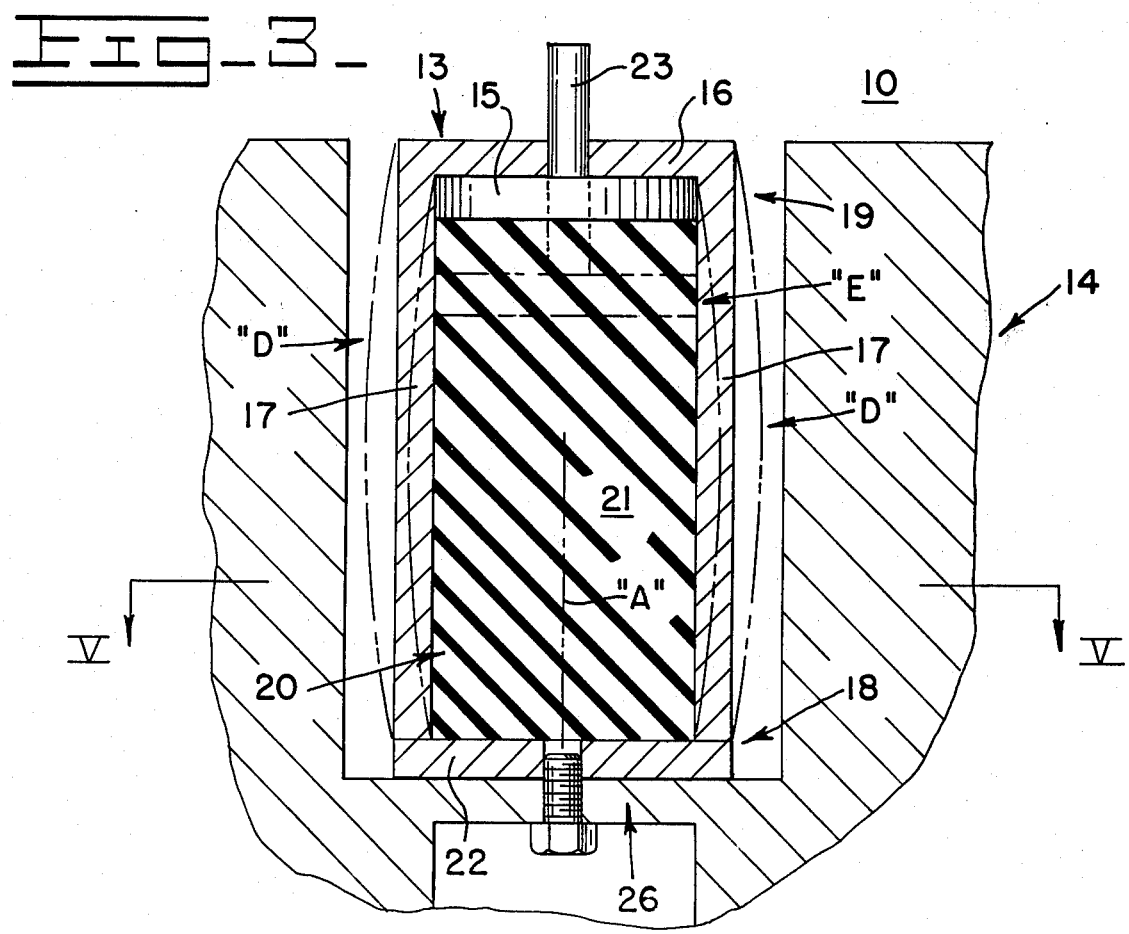

BIASING ELEMENT HAVING ONE OR MORE FORCE STAGES

BACKGROUND OF THE INVENTION

In the construction of machinery, it is sometimes desirable to provide biasing means for exerting a first reaction force against an element and, after a preselected amount of movement, exert a second greater reaction force against the element. Under certain dirty environments and biasing requirements, a plurality of compressible helical springs actuated by a piston malfunction and/or do not provide the preselected, desired biasing forces. The apparatus of this invention is provided to solve this problem.

One use that is expected to be made of the apparatus of this invention is to controllably dampen the contacting forces between a sprocket wheel and a track of a continuous track of a crawler-type vehicle and thereby suppress emitted noise and reduce wear. A biasing means which will perform some of the functions of the apparatus of this invention is shown in U.S. Pat. No. 3,889,550, which issued to Roger L. Boggs et al on June 17, 1975, from an application filed on Nov. 19, 1973, and which is assigned to the assignee of the subject invention.

This invention therefore resides in a biasing element having a housing having resilient walls, an axis, first and second end portions, and a chamber. A force transmitting material is positioned within the chamber between a retaining means and a piston. The piston is movable between a first position at which the piston is in contact with the force transmitting material and a second position at which the force transmitting material is moved by the piston into forcible contact with resilient walls of the housing and said housing walls are deflected in response to said forcible contact by said force transmitting material.

BRIEF DESCRIPTION OF THE DRAWINGS

FIG. 1 is a diagrammatic partial view of a crawler-type vehicle having the apparatus of this invention;

FIG. 2 is a diagrammatic partial view of a crawler-type vehicle having another embodiment of the apparatus of this invention;

FIG. 3 is a diagrammatic frontal view in partial section of the apparatus of this invention;

DETAILED DESCRIPTION OF THE INVENTION

Figure 4:
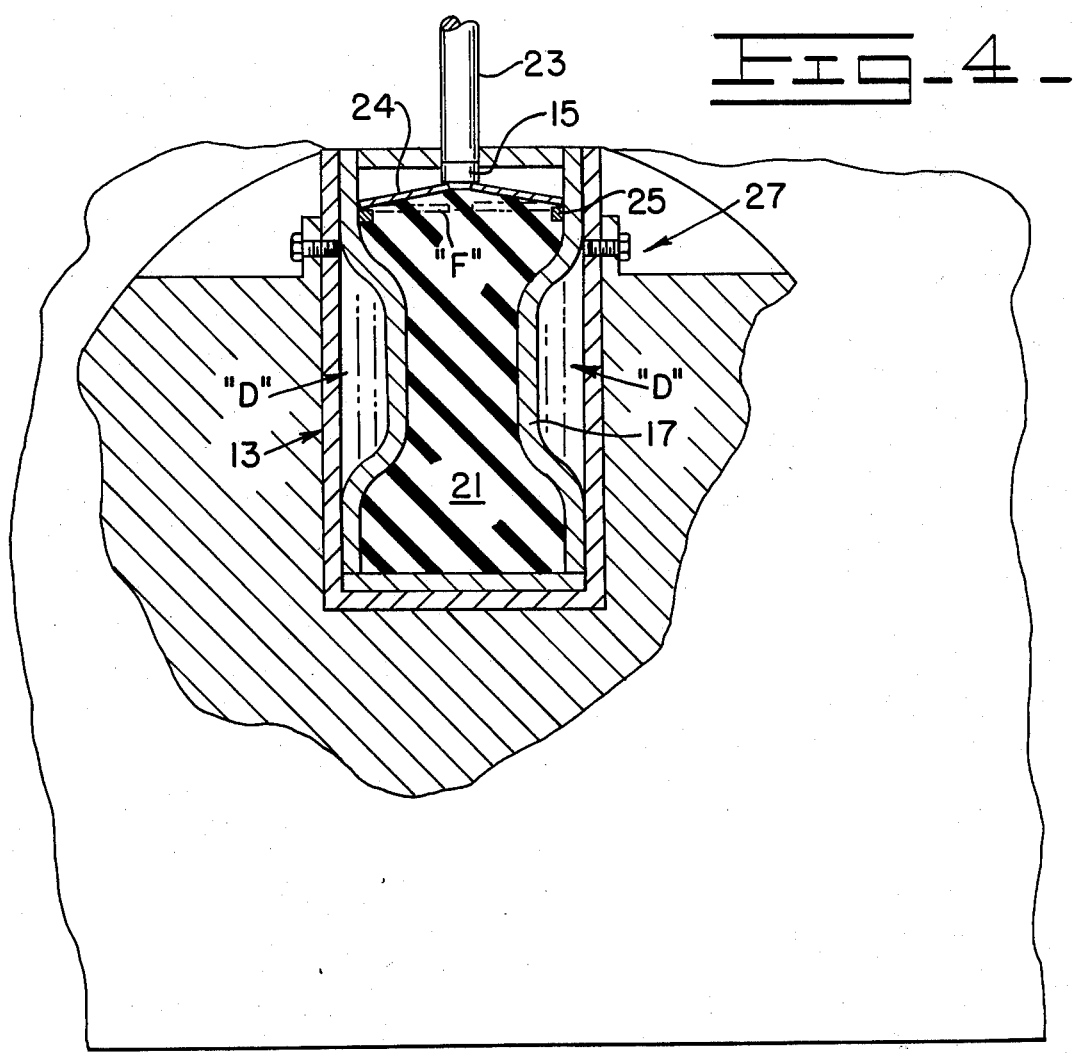
FIG. 4 is a diagrammatic frontal view in partial section of another embodiment of the apparatus of this invention.

Referring to FIGS. 1 and 2, a crawler-type vehicle 10, such as a crawler tractor for example, has a continuous track 11 formed of a plurality of interconnected track shoes 12, as is known in the art. In the embodiment of FIG. 1, the biasing element 13 of this invention is connected to a sprocket 14 of the vehicle 10 at a location sufficient for movement of a piston 15 of the element 13 in response to contact with a portion of the track 11 during operation of the vehicle 10. In the embodiment of FIG. 2, the biasing element 13 of this invention is connected to a track 11 of the vehicle 10 at a location sufficient for movement of a piston 15 of the element 13 in response to contact with the sprocket 14 during operation of the vehicle 10.

Referring to FIG. 3, the biasing element 13 has a resilient housing 13, formed of steel for example, that has walls 17 that are deflectable from the position shown by solid lines to the position shown by broken lines and indicated by letter "D". The housing 16 has an axis "A", first and second end portions 18, 19, and a chamber 20.

A force transmitting material 21, selected from rubber, formed organic plastic, metal shot, or viscous liquid, is positioned within the resilient housing chamber 20.

Means 22, such as an end plate or stop, is positioned at the first end portion 18 of the housing 16 for maintaining the force transmitting material 21 within the housing 16.

A piston 15 is positioned within the chamber 20 at the second end portion 19 of the housing 16 and has an actuating element 23 extending through and outwardly from the housing 16. The piston 15 is moved through the chamber 20 in response to a load being placed on the actuating element 23. The piston 15 is movable between a first position, shown by solid lines, at which the piston 15 is in contact with the force transmitting material 21 and a second position, shown by broken lines and indicated by letter "E", at which the force transmitting material 21 is moved by the piston 15 into forcible contact with the resilient housing walls 17 and said housing walls are deflected outwardly to locations "D" in response to said forcible contact by said resilient material 21.

The force transmitting material 21 and the resilient housing 16 can be of a construction and of materials sufficient for requiring a first force of a preselected magnitude exerted on the actuating element 23 to compress the force transmitting material 21 and a second greater force to compress the force transmitting material 21 sufficiently to deflect the housing walls 17.

Referring to FIG. 4, a Belleville spring 24, as is known in the art, is positioned in the chamber 20 between the piston 15 and the force transmitting material 21. During movement of the piston 15 from the first to the second position, the Belleville spring 24 is deflected to the position shown by broken lines indicated by letter "F". The force transmitting material 21 can be formed of rubber or foamed organic plastic and be of a size of sufficient for deflection of the Belleville spring 24 prior to contact and compression of the force transmitting material 21 or of a size sufficient for compression of the force transmitting material upon initial deflection of the Belleville spring 24. In one construction the biasing element 13 will have three force stages, and in the last mentioned construction the element 13 will have two force stages as in the embodiment of FIG. 3, but will generally provide biasing of an increased magnitude. Where metal shot or a viscous material is utilized, the element 13 will generally have a single force stage.

Means 25 such as stops or biasing grooves can be provided to assure maintaining the outer periphery of the Belleville spring 24 at a preselected location during movement of the piston 15 between the first and second positions. The Belleville spring 24 can, however, be constructed to move in response to movement of the piston 15 into forcible contact with the force transmitting material 21.

Means 26 of FIG. 3, such as sprocket openings and bolts, can be used for connecting the element 13 to the sprocket wheel 14 or means 27 of FIG. 4, such as a flange and bolts, can be used for connecting the element 13 to a track 11.

In the embodiment of FIG. 4, the Belleville spring 24, force transmitting material 21, and resilient housing 16 are each of a construction sufficient for requiring a first force to deflect the Belleville spring 24, a second force to deflect said spring 24 and compress the force transmitting material 21, and a third force to deflect the spring, compress the force transmitting material 21 and deflect the housing walls to position "D", with said first, second, and third forces being respectively of a progressing greater magnitude. For example, force 1 can be 20 lbs.; force 2 can be 30 lbs.; and force 3 can be 60 lbs.

One skilled in the art of material properties can easily select the materials and determine the construction parameters of the apparatus after the preselected forces to be exerted on actuating element 23 are selected for the particular machine upon which the apparatus of this invention is to be used.

Figure 7:
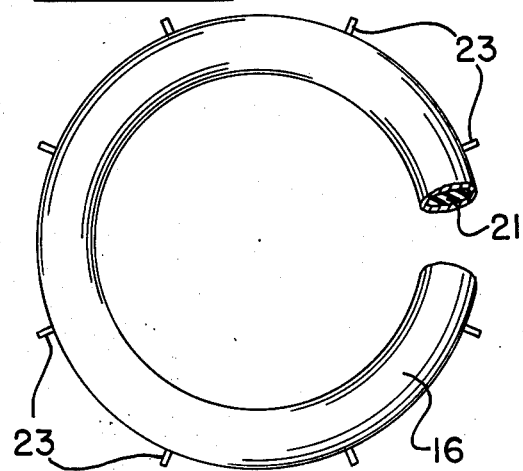
FIG. 7 is a diagrammatic side view in partial section of a different embodiment of the housing.
Figure 5:
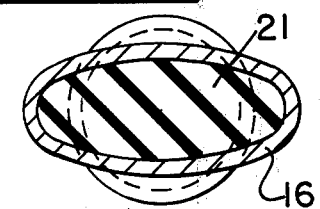
FIGS. 5 and 6 are diagrammatic sectional views taken along line V—V of FIG. 3 of different embodiments of the apparatus of this invention.
Figure 6:
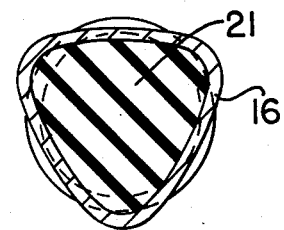

For example, the embodiment of FIG. 3 can be easily and controllably altered to resist various forces by constructing the resilient material 21 and resilient housing 16 of different materials which have different moduli of elasticity or have movable, level seeking properties such as metal shot or viscous liquid. The element 13 can also be altered to resist various preselected forces in a controlled manner by changing the configuration of the housing. This configuration change can be a change in cross-sectional dimensions along the axis as shown in FIG. 4 as can be a cross-sectional configuration that is other than circular, as shown for example in FIGS. 5, 6 and 7. It is preferred, however, that the chamber 20 be of a configuration other than columnar to facilitate deflection of the walls 17.

In the operation of the apparatus of this invention, for example during use on a crawler-type tractor, as the actuating element 23 contacts the sprocket or track, depending upon placement, the piston 15 is moved toward the second position. Movement of the piston 15 contacts the force transmitting material 21 and causes it to move outwardly and into forcible contact with the housing walls 17, which thereafter causes the walls 17 to be deflected. The force to move the force transmitting material 21 and subsequently deflect the walls 17, in the example use, causes impact between the track 11 and the drive sprocket 14 to be reduced, thereby reducing undesirable wear and noise.

Other applications of this invention and construction modifications can be made by one skilled in the art without departing from this invention.

What is claimed is:

1. A biasing element, comprising:
   a housing having resilient walls, an axis, and a chamber, said walls being outwardly movable in response to a force of a preselected magnitude;
   a compressible force transmitting material positioned within the housing chamber, said force transmitting material transmitting said force outwardly against the housing walls;
   means for maintaining the force transmitting material within the housing;
   a piston positioned in the housing and being movable through the chamber between a first position at which the piston is urging against the force transmitting material and a second position at which the force transmitting material is moved by the piston into forcible contact with the resilient housing walls and said housing walls are moved outwardly in response to said forcible contact by said force transmitting material being at said preselected magnitude; and
   a Belleville spring positioned in the chamber between the piston and force transmitting material.

2. Apparatus, as set forth in claim 1, including
   means for maintaining the outer periphery of the Belleville spring at a preselected location during movement of the piston between the first and second positions.

3. Apparatus, as set forth in claim 1, wherein
   the Belleville spring, force transmitting material, and housing walls are connected and wherein a first force deflects only the Belleville spring, a second force deflects the Belleville spring and compresses the force transmitting material in response to movement of the Belleville spring while maintaining the housing walls free of deflection in response to said second force, and a third force deflects the Belleville spring, compresses the force transmitting material and deflects the housing walls, said first, second, and third forces being respectively of a progressively greater magnitude.

4. Apparatus, as set forth in claim 1, wherein the cross-sectional configuration of the housing chamber taken normal to the axis is other than circular.

5. Apparatus, as set forth in claim 1, including:
   means for attaching the biasing means to a sprocket of a crawler-type vehicle at a location sufficient for movement of the piston in response to contact with a track of the vehicle.

6. Apparatus, as set forth in claim 1, including:
   means for attaching the biasing means to a track of a crawler-type vehicle at a location sufficient for movement of the piston in response to contact with a sprocket of the vehicle.

* * * * *